(12) United States Patent
Shupe et al.

(10) Patent No.: US 6,941,139 B1
(45) Date of Patent: Sep. 6, 2005

(54) METHOD AND SYSTEM FOR AUTOMATICALLY UPDATING A SERVING MSC WITH A CHANGE IN A SUBSCRIBER PROFILE

(75) Inventors: Lester B. Shupe, Broomfield, CO (US); David R. Clark, Longmont, CO (US)

(73) Assignee: Qwest Communications International, Inc., Denver, CO (US)

( * ) Notice: Subject to any disclaimer, the term of this patent is extended or adjusted under 35 U.S.C. 154(b) by 498 days.

(21) Appl. No.: 09/648,908

(22) Filed: Aug. 25, 2000

(51) Int. Cl.[7] ............................................. H04Q 7/20
(52) U.S. Cl. ................ 455/432.3; 455/433; 455/435.1; 455/432.2; 455/432.1
(58) Field of Search ............................ 455/406, 422.1, 455/433, 432.1–432.3, 435.1–435.3, 410, 455/560, 461, 414.1–414.4

(56) References Cited

U.S. PATENT DOCUMENTS

| 5,274,802 | A | * | 12/1993 | Altine | 707/202 |
|---|---|---|---|---|---|
| 5,857,153 | A | * | 1/1999 | Lupien | 455/422 |
| 5,913,165 | A | * | 6/1999 | Foti | 455/435 |
| 5,915,220 | A | * | 6/1999 | Chelliah | 455/435 |
| 5,958,016 | A | * | 9/1999 | Chang et al. | 709/229 |
| 6,067,456 | A | * | 5/2000 | Duran | 455/461 |
| 6,088,796 | A | * | 7/2000 | Cianfrocca et al. | 713/152 |
| 6,108,540 | A | * | 8/2000 | Sonti et al. | 455/433 |
| 6,112,079 | A | * | 8/2000 | Lamb | 455/411 |
| 6,256,379 | B1 | * | 7/2001 | Gillespie | 379/230 |
| 6,295,291 | B1 | * | 9/2001 | Larkins | 370/352 |
| 6,393,271 | B1 | * | 5/2002 | Dougherty | 455/411 |
| 6,397,058 | B1 | * | 5/2002 | Thibert et al. | 455/414 |
| 6,449,479 | B1 | * | 9/2002 | Sanchez | 455/433 |
| 6,584,312 | B1 | * | 6/2003 | Morin et al. | 455/433 |
| 6,603,969 | B1 | * | 8/2003 | Vuoristo et al. | 455/433 |
| 6,611,684 | B1 | * | 8/2003 | Franks | 455/433 |

* cited by examiner

*Primary Examiner*—Stephen D'Agosta
(74) *Attorney, Agent, or Firm*—Townsend and Townsend and Crew LLP

(57) ABSTRACT

A method and system for automatically updating a serving MSC with a change in a subscriber profile includes receiving an update at a database regarding a change in a subscriber's profile. A stored procedure is initiated at the database to generate a request to the Service Location Register to send a profile update to the switching center for the subscriber.

25 Claims, 4 Drawing Sheets

METHOD AND SYSTEM FOR AUTOMATICALLY UPDATING A SERVING MSC WITH A CHANGE IN A SUBSCRIBER PROFILE

TECHNICAL FIELD

This invention relates to a method and system for automatically updating a serving Mobile Switching Center (MSC) when a change has been made by a customer support center to a subscriber's Profile such as a call feature set.

BACKGROUND ART

A prior art wireless communication system is shown in FIG. 1 and designated generally by reference 10. Wireless network 10 includes a Central Office Switch (COS) 12 which, in an Advanced Intelligent Network (AIN), may comprise a Service Switching Point (SSP). COS 12 is provided in communication with the Public Switched Telephone Network (PSTN) 14 and one or more subscribers, each having at least one Customer Premises Equipment (CPE) device 16 such as a telephone. COS 12 is further provided in communication with a Mobile Switching Center (MSC) 20. MSC 20 is, in turn, provided in communication with an Intelligent Peripheral (IP) 22, a Home Location Register (HLR) 24 and one or more Base Station Controllers (BSCs) 26. Each BSC 26 is provided in communication with one or more Base Stations (BSs) 28. Finally, each BS 28 is provided in communication with one or more mobile handsets 30, each having an assigned calling number known as a Mobile Directory Number (MDN) or Mobile Identification Number (MIN). Each handset is also assigned an Electronic Serial Number (ESN).

In an Advanced Intelligent Network, COS 12 may comprise an SSP which is generally a node, usually the Subscriber's Local Switch/Central Office Switch or an access tandem (Long-Distance) switching office which recognizes the triggers generated when a subscriber's service invokes an Intelligent Network Trigger and then communicates an SCP to operate the service. As those skilled in the art will recognize, an SCP is a node which contains the service logic and associated data support including configuration and call completion database to execute the required customer services. An SSP is generally provided in communication with one or more Signal Transfer Points (STPs) which are packet switches used to route signaling messages within the network. In limited traffic situations, Service Switching and Control Points (SSCPs) may also be provided for combining the functions of the SCP and SSP respectively.

The above components comprise the common channel signaling system No. 7 (CCSS7) which is an end-to-end signaling system designed for use primarily in high speed digital networks such as an Advanced Intelligent Network. The CCSS7 is capable of accommodating low-speed analog facilities as well. It typically operates at 64 Kbps and can support variable message lengths up to approximately 2,176 bits (272 octets) of information per message. New network services are typically installed on at least two SCP platforms for directly servicing a selected market. The CSS7 Network extends management and control to remote SCPs/adjuncts.

Still referring to FIG. 1, in operation, a call to a mobile subscriber having handset 30 and a preassigned Mobile Identification Number (MIN), and Electronic Serial Number (ESN), is forwarded through the Public Switched Telephone Network (PSTN) 14 to COS 12. The COS performs a database lookup and identifies the called party directory number as a MIN which corresponds to a specific mobile subscriber and handset 30. COS 12 then forwards the call to the subscriber's home MSC 20.

As recognized, in the example given, the subscriber's home MSC and serving MSC are the same. However, in operation, it is anticipated that the subscriber's serving MSC may be a different MSC such as, for example, when the subscriber is out of her home coverage area and "roaming" on another wireless network. The serving MSC, here MSC 20, will thereafter launch a query to HLR 24 requesting the location of handset 30, as well as call termination parameters including the subscriber's profile or call feature set. MSC will also request a Temporary Location Number (TLN) assigned to subscriber 30 if the subscriber is currently roaming on another network. This request, termed a Location Request Message (LOCREQ) typically includes information such as Calling Party Identification, (the calling party directory numbers) Called Party Identification (the subscriber's MIN and TCN) and Redirecting Party Identification, the details of which are well know in the art and will not be discussed in further detail here. Thereafter, MSC 20 alerts handset 30 by generating a ringing signal.

In an ANSI-41 network, HLR 24 periodically receives and stores update information regarding the location of Handset 30 and assigned call parameters. This typically occurs whenever subscriber 30 "powers on" or enters a different wireless serving area and initiates the registration process. In operation, handset 30 detects the presence of a Base Station (BS) 28 or Base Station Controller (BSC) 26. BS 28 or BSC 26, in turn, alerts the serving MSC, here MSC 20, that the handset 30 has begun registration. MSC 20 thereafter sends a Registration Notification Message (REGNOT) to HLR 24 requesting call termination parameters for handset 30. HLR 24 then sends a Registration Notification Response message (regnot) to MSC 20. The Registration Notification Response message provides the above-referenced call termination parameters for subscriber 30 including whether the party has subscribed to certain call features such as Call Forwarding, Single Number Service™, etc. MSC 20 then stores this information for subsequent processing.

As those skilled in the art will recognize, changes in a subscriber's call feature set, i.e. the subscriber's Profile, will be updated at the serving MSC whenever the subscriber powers on or enters a wireless serving area and begins the registration process as indicated above. However, changes which occur at any other time outside of the registration process, may not be updated at the MSC. A typical situation occurs when a mobile subscriber who has already registered with a serving MSC, places a call to a customer support service to change his or her profile. By way of example, the subscriber may request that the call feature "Call Forwarding" be enabled or disabled. A customer support representative using an appropriate user interface such as a web-based interface, will make the change directly at the subscriber's HLR 24. Messaging between HLR 24 and the subscriber's serving MSC 20, however, called a "Qualification Directive" (QUALDIR), will typically not occur, however, unless the subscriber "re-registers" by turning his or her mobile phone off and then on. Absent such re-registration, or a preprogrammed location request message on the part of MSC 20 as part of a periodic update function, a Qualification Directive will not be sent and MSC 20 will be unaware of the change in the subscriber's profile.

Consequently, a need has developed for an automated method for updating a serving MSC with a change in a subscriber's profile without requiring the subscriber to end the call with a customer support center and powercycle their handset.

DISCLOSURE OF INVENTION

It is a principal object of the present invention to provide an automated method for updating a serving MSC with a change in subscriber's profile.

In carrying out the above object, there is provided an automated method for updating an MSC which is specifically adapted for use in a communication system which includes a Home Location Register (HLR), a serving Mobile Switching Center (MSC), and a plurality of subscribers. The method includes receiving an update as a database in communication with the HLR regarding a change in a subscriber Profile. The method further comprises initiating a stored procedure in the database to generate a request to the HLR to send a Qualification Directive to the serving MSC for the subscriber. Finally, the method includes sending the Qualification Directive to the MSC.

These and other objects, features, and advantages of the present invention will become more readily apparent with reference to the following description of the drawings where like referenced numerals correspond to like components.

BEST MODE FOR CARRYING OUT THE INVENTION

The present invention utilizes the built-in capabilities of a database "stored procedure" to initiate a Qualification Directive (QUALDIR) command from a Home Location Register directly to a wireless subscriber's serving Mobile Switching Center following a change in the subscriber's profile at a database.

As those skilled in the art will recognize, a stored procedure is a program which runs in a database and can take complex actions based on the inputs the user sends it. Using a stored procedure is typically faster than doing the same work on a database client, because the program runs inside the database server. In the case of SQL statements, for example, a user may put a batch of such statements in a "procedure" stored in a Sybase server database. Stored procedures may include parameters designed as part of the stored procedure creation statement to allow the procedures to be used in a flexible fashion. Stored procedures are typically stored in a server in a precompiled format. In this manner, many users may invoke the same query with different parameters.

Figure 1:
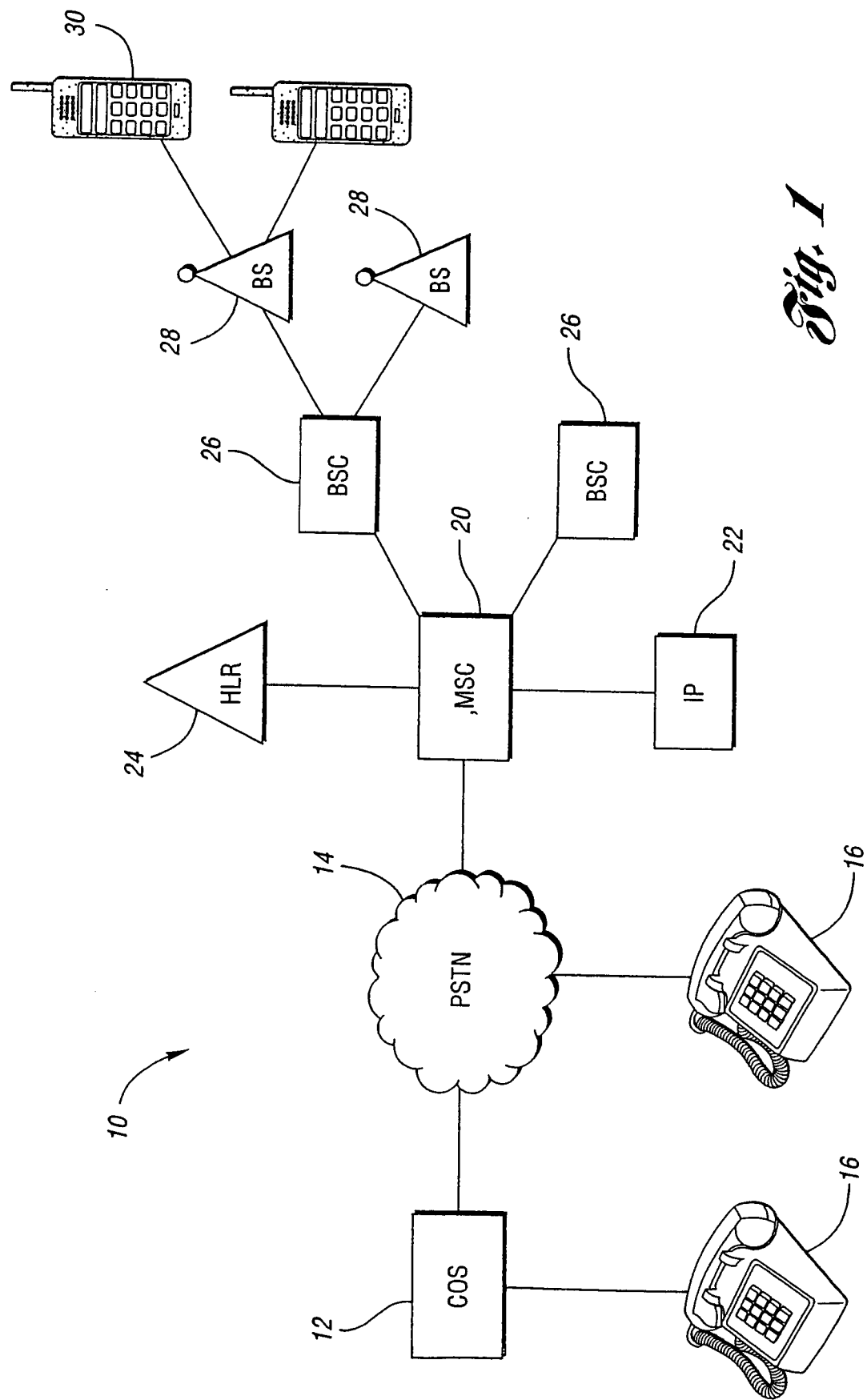
FIG. 1 is a schematic diagram of a prior art wireless network.
Figure 2:
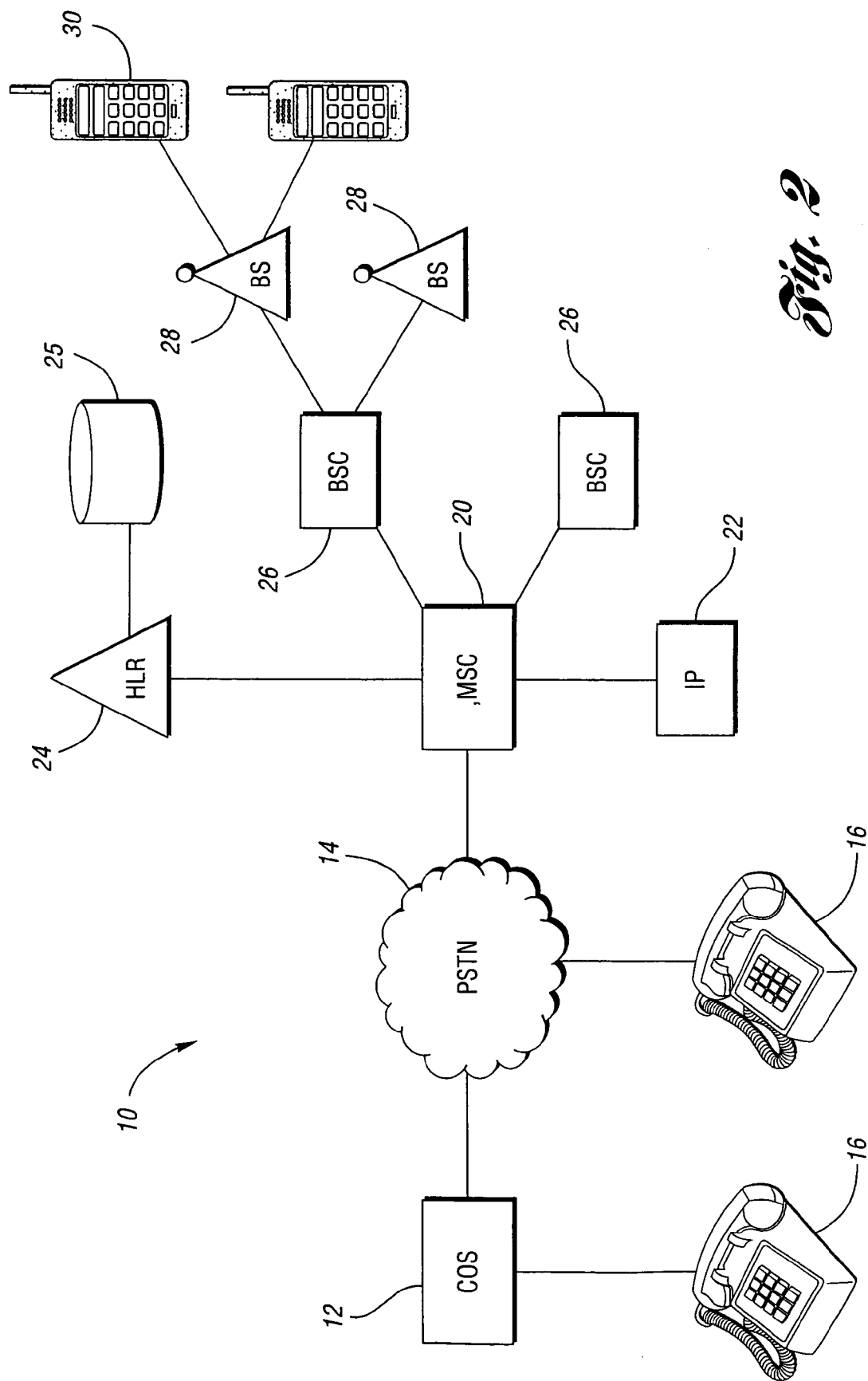
FIG. 2 is a schematic diagram of the system of the present invention.
Figure 4:
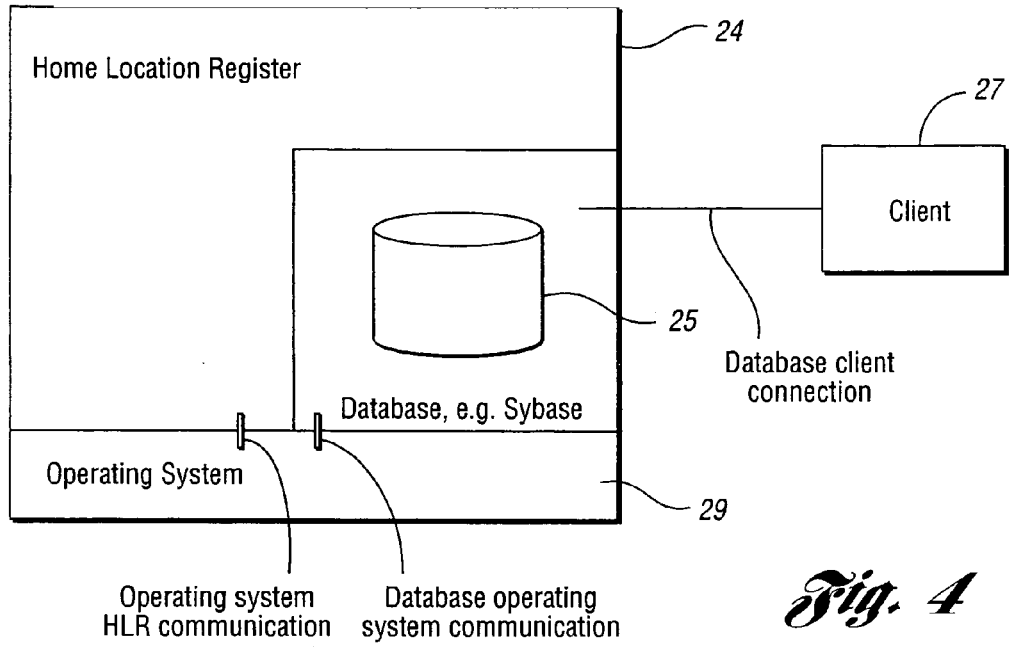
FIG. 4 is a schematic diagram of the system of the present invention.

With reference to FIGS. 2 and 4 of the drawings, those skilled in the art will recognize that Home Location Register (HLR) 24 includes or is provided in communication with a database 25 which functions to store the Profile of each subscriber in a wireless communication system. This Profile includes the feature sets to which the subscriber has subscribed to such as, for example, Call Forwarding, Voice Mail, etc. Database 25 is, in turn, provided in communication with a Service Center 27 via a database client connection. Database 25 is further provided in communication with an operating system 29 via a database operating system communication 31 such as, for example, Solaris version 7.0 or 8.0 or IBM AIX, HP UX, or Windows NT etc. Finally, HLR 24 is provided in communication with operating system 29 via an HLR communication 33. In the preferred embodiment, database 25 is a Sybase release 11.5 or later, which uses an XP CMDSHELL command to initiate the above-referenced Qualification Directive (QUALDIR) IS-4 message. Sybase transact-SQL commands are an example of an update to the database, which then requires the sending of a QUALDIR message to the switch that is facilitated by the present invention. Other databases and corresponding commands are, of course, understood to be within the scope of the present invention including, but not limited to, Oracle, Informix, etc.

As indicated above, prior to the present invention, the Qualification Directive, i.e. an update message from HLR 26 to a serving MSC 30 generally occurs only upon receipt of a request from MSC in response to registration of a subscriber. In keeping with the invention, any change to database 28 will initiate a stored procedure which generates a request to HLR 26 to automatically send a Qualification Directive (QUALDIR) to the serving MSC 30 with the corresponding change for a given subscriber.

Figure 3:
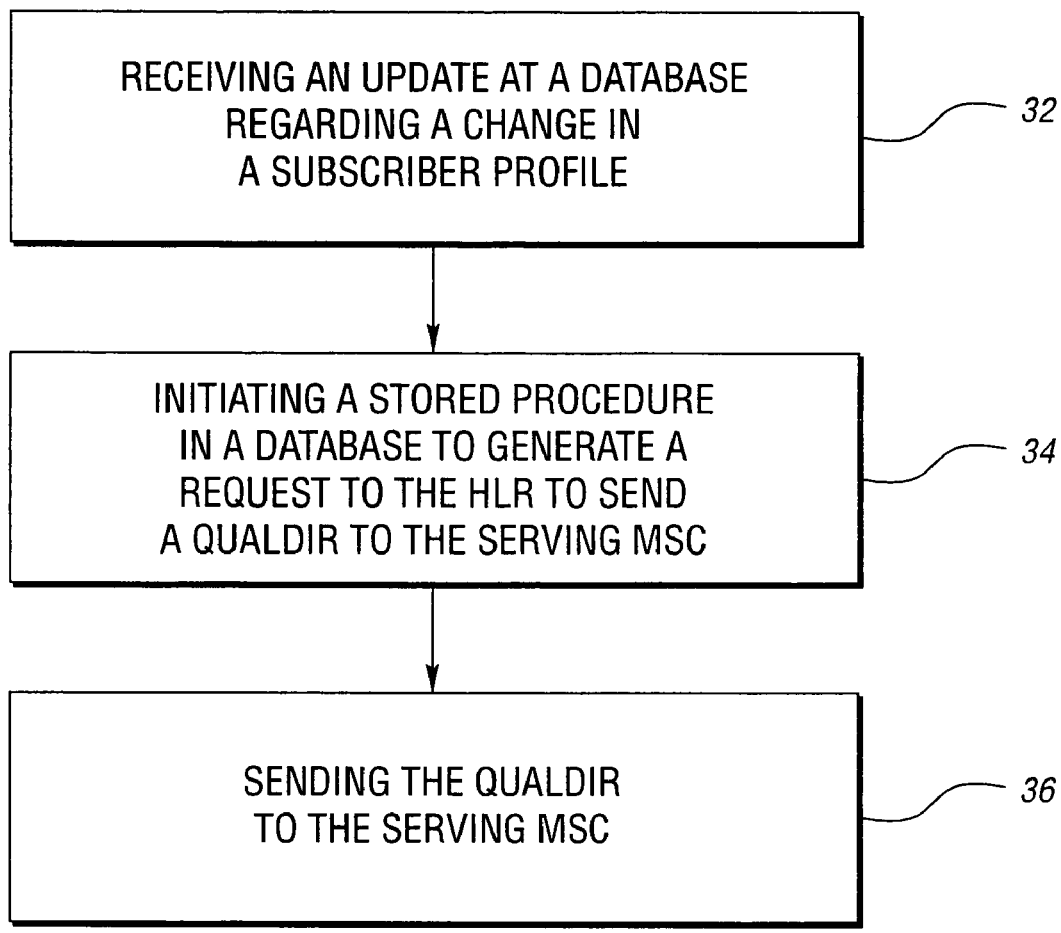
FIG. 3 is a block diagram of the method steps of the present invention.

FIG. 3 of the drawings provides a more detailed review of the method steps of the present invention. As shown therein, the method comprises receiving 32 an update at a database regarding a change in a Profile for a subscriber having a given Directory Number (DN) or Mobile Identification Number (MIN). The method further comprises initiating 34 a stored procedure in a database to generate a request to the HLR to send a Qualification Directive to the serving MSC for the subscriber. As indicated above, the Qualification Directive includes an update to the subscriber's profile. Finally, the method comprises sending 36 the Qualification Directive to the serving MSC.

Figure 5:
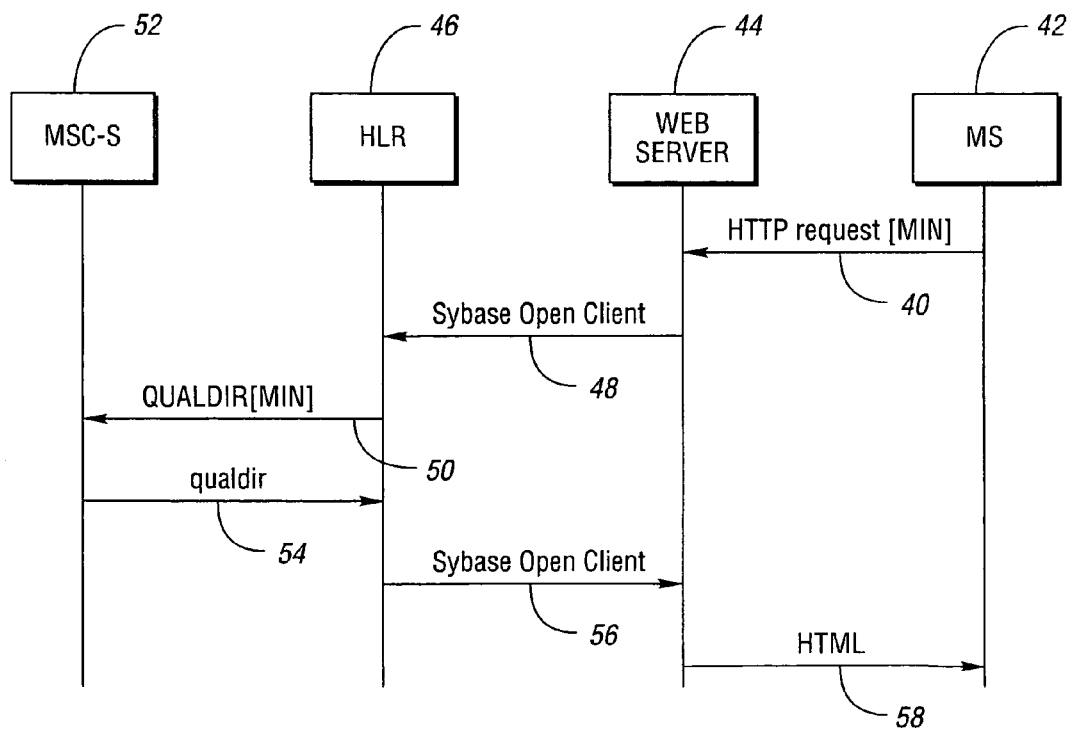
FIG. 5 is a flow diagram of the method of the present invention.

FIG. 5 of the drawings illustrates an exemplary invocation via an HTTP (web) client. As shown, a computer running a web browser initiates a request 40 to change service for a Mobile Identification Number (MIN) for a subscriber 42. The MIN is included in the request along with parameters that need to be changed. This request is sent to the Web Server 44. Upon receipt, Web Server 44 communicates 48 directly with the database on the HLR 46. This communication can be any one of several ways including, but not limited to, Sybase Open Client for Sybase, SQL*NET for Oracle, JDBC for Java, or any other database specific protocol. Web Server 44 thereafter requests that a stored procedure within HLR 46 be executed. In keeping with the invention, the stored procedure updates data in the HLR 46 database with the data sent to it from the web server 44 and then initiates a request, through the operating system, to initiate a QUALDIR 50. The HLR46 thereafter sends the QUALDIR to the serving Mobile Switching Center (MSC) 52. MSC 52 then returns a qualdir return request 54 to the HLR 46. The HLR DB stored procedure completes processing and sends back the result 56 to the web server 44. Finally, the web server 44 formats the response into appropriate HTML 58 and sends a web page to the browser to indicate the outcome of the procedure.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a wireless communication system including a Service Location Register, at least one Switching Center, and a subscriber, the subscriber having at least one profile associated with the subscriber, a method of automatically updating a Switching Center with a change in the subscriber's profile, the method comprising:

receiving an update at a database regarding a change in the subscriber's profile;

in response to the received update, generating a request to the Service Location Register to send a profile update for the subscriber to a Switching Center; and in response to the request and without receiving a request for the subscriber's profile from any Switching Center, sending a qualification directive to to the Switching Center, the qualification directive including an update to the subscriber profile, the update to the subscriber profile including at least one feature set to which the subscriber has subscribed.

2. A method as in claim 1, wherein the Service Location Register is a Home Location Register (HLR).

3. A method as in claim 1, wherein the Service Location Register is a Wireless Service Location Register (WSLR).

4. A method as in claim 1, wherein the Switching Center is a Mobile Switching Center (MSC).

5. The method of claim 1, wherein generating a request to the Service Location Register to send a profile update to the Switching Center for the subscriber comprises initiating a stored procedure in the database.

6. A method as in claim 1, wherein receiving an update includes receiving a request initiated by a web browser.

7. A method as in claim 1, wherein the request is generated in response to the update received at the database.

8. The method of claim 1, wherein receiving an update comprises receiving an update adding a service to the subscriber's profile.

9. For use in a wireless communication system including a Home Location Register (HLR), at least one Mobile Switching Center (MSC), and a plurality of subscribers, each of the plurality of subscribers having at least one subscriber profile associated with the subscriber, a method of automatically updating the MSC with a change in the subscriber profile, the method comprising:

receiving an update at a database regarding a change in the subscriber profile;

in response to the update, initiating a stored procedure in the database to generate a request to the HLR to send a qualification directive to an MSC, the qualification directive including an update to the subscriber profile, the update to the subscriber profile including at least one feature set to which the subscriber has subscribed; and in response to the request and without receiving a request for the subscriber's profile from any MSC, sending the qualification directive to the MSC.

10. A method as in claim 9, wherein receiving an update includes receiving a request initiated by a web browser.

11. A method as in claim 9, wherein the stored procedure is initiated in response to the update received at the database.

12. For use in a wireless communication system having at least one subscriber, the subscriber having at least one subscriber profile associated with the subscriber, a system for automatically updating a Switching Center with a change in the subscriber's profile, the system comprising:

a database configured to receive an update regarding a change in the subscriber's profile and in response to the update, generate a request to the Service Location Register to send a profile update to a Switching Center;

a Service Location Register in communication with the database, the Service Location Register being configured to:

receive the request to send the profile update to the Switching Center; and in response to the request and without receiving a request for the subscriber's profile from any Switching Center, send a qualification directive to the Switching Center, the qualification directive including the requested profile update, the profile update including at least one feature set to which the subscriber has subscribed.

13. A system as in claim 12, wherein the Service Location Register is a Wireless Service Location Register.

14. A system as in claim 12, wherein the Switching Center is a Mobile Switching Center (MSC).

15. A system as in claim 12, wherein the database is a Sybase database.

16. A system as in claim 12, wherein the request generated by the database is a qualification directive.

17. A system as in claim 12, wherein the database is configured to receive communications via a web browser, and wherein receiving an update comprises receiving an update request initiated by a web browser.

18. A system as in claim 12, wherein the database is further configured to generate the request in response to receiving the update.

19. In a telecommunications system comprising at least one Switching Center and a plurality of subscribers, each of the plurality of subscribers having at least one associated subscriber profile, a system for automatically updating a Switching Center with a change to a subscriber's profile, the system comprising:

means for receiving an update regarding a change in the subscriber's profile;

means for generating a request to send a profile update for the subscriber to a Switching Center in response to the update;

means for sending a qualification directive to the Switching Center, the qualification directive including an update to the subscriber's profile, the update to the subscriber profile including at least one feature set to which the subscriber has subscribed, in response to the request and without receiving a request for the subscriber's profile from any Switching Center.

20. A system as in claim 19, further comprising:

means for initiating a stored procedure to generate the request.

21. A system as in claim 19, further comprising:

means for receiving a communication from a web browser, the communication comprising the update regarding a change in the subscriber's profile.

22. For use in a wireless communication system including a Service Location Register, at least one Switching Center, and a subscriber, the subscriber having at least one profile associated with the subscriber, a method of automatically updating the Switching Center with a change in the subscriber's profile, the method comprising:

using a database client connection from a service center to update a database regarding a change in the subscriber's profile;

at the database, automatically generating a request to the Service Location Register to send a profile update for the subscriber to a Switching Center in response to the update; and in response to the request and without receiving a request for the subscriber's profile from any Switching Center, sending a qualification directive to the Switching Center, the qualification directive including an update to the subscriber profile, the update to the subscriber profile including at least one feature set to which the subscriber has subscribed.

23. A method as recited in claim 22, wherein the database client connection comprises a request initiated from an HTTP (web) client.

24. For use in a wireless communication system having at least one subscriber, the subscriber having at least one subscriber profile associated with the subscriber, a system for automatically updating a Switching Center with a change in the subscriber's profile, the system comprising:

a database configured to receive an update via a database client connection from a service center regarding a change in the subscriber's profile and in response to the update, generate a request to the Service Location Register to send a profile update to a Switching Center;

a Service Location Register in communication with the database, the Service Location Register being configured to:

receive the request to send the profile update to the Switching Center; and in response to the request and without receiving a request for the subscriber's profile from any Switching Center, send a qualification directive to the Switching Center, the qualification directive including an update to the subscriber profile, the update to the subscriber profile including at least one feature set to which the subscriber has subscribed.

25. A system as recited in claim 24, wherein the database client connection comprises a request initiated from an HTTP (web) client.

* * * * *